UNITED STATES PATENT OFFICE.

JOSEPH BONGARTZ, OF AACHEN, ASSIGNOR TO THE FARBWERKE, VORMALS MEISTER, LUCIUS & BRÜNING, OF HÖCHST-ON-THE-MAIN, GERMANY.

GUAIACOL ETHER.

SPECIFICATION forming part of Letters Patent No. 453,035, dated May 26, 1891.

Application filed May 8, 1890. Serial No. 351,089. (Specimens.)

*To all whom it may concern:*

Be it known that I, JOSEPH BONGARTZ, a citizen of the Empire of Germany, residing at Aachen, in the Empire of Germany, have invented certain new and useful Improvements in the Production of Guaiacol Ether; and I do hereby declare the following to be a full, clear, and exact description of the invention, such as will enable others skilled in the art to which it appertains to make and use the same.

A great objection to the employment of guaiacol for medical purposes is its disagreeable taste and its locally-irritating action when it is in a concentrated state. This objection is removed when the guaiacol is converted into the corresponding benzoic ether $C_6H_4\begin{cases}(1)O.CO.C_6H_5\\(2)O.CH_3\end{cases}$ and this is substituted for the guaiacol itself. The body is gradually saponified by the gastric juice and the guaiacol in this way absorbed by the organism.

The benzoic ether of the guaiacol is prepared in the following way: The crude guaiacol having a boiling-point from 200° to 205° centigrade as it is obtained by fractional distillation from wood-tar is converted into its salt, preferably its potassium salt, which is purified by recrystallization from alcohol. Other salts such as guaiacol forms with alkaline earths may be used in this manner for the separation of impurities soluble in alcohol. The salt obtained in a pure state in this way is heated with a suitable proportion of benzoylchloride in a water bath, and the benzoyl compound thus formed is recrystallized from alcohol. For example, if the potassium salt is employed this salt is submitted to the action of about the equal quantity of benzoylchloride, whereby the following transposition takes place:

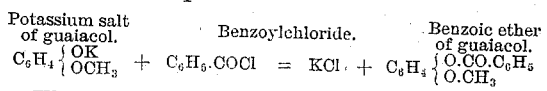

The guaiacol might be used directly to produce the benzoic ether by heating it with benzoylchloride or benzoic anhydride; but this method is less advantageous than that above described.

The benzoic ether of guaiacol is nearly insoluble in water and is with difficulty soluble in glacial acetic acid; but it is readily soluble in chloroform and ether, also in hot alcohol. It is in form of small colorless crystals having a melting-point of 50° centigrade, and in a pure state it is nearly without smell and taste.

The benzoic ether of guaiacol is to be employed as medicine in cases of phthisis. Dose, one to five grams a day.

What I claim as my invention, and desire to secure by Letters Patent, is—

As a new article of manufacture, the benzoic ether of guaiacol in the form of small colorless crystals having a melting-point of 50° centigrade, nearly insoluble in water, of difficult solubility in glacial acetic acid, but readily soluble in chloroform and ether, also in hot alcohol, in a pure state nearly without smell and taste.

In testimony whereof I affix my signature in presence of two witnesses.

JOSEPH BONGARTZ.

Witnesses:
 TH. WITTNICH,
 WILH. SCHWARZ.